United States Patent [19]

Tanaka et al.

[11] Patent Number: 5,284,348
[45] Date of Patent: Feb. 8, 1994

[54] APPARATUS FOR CUTTING OCULAR LENS MATERIALS

[75] Inventors: Kyoichi Tanaka; Toyoyasu Tanaka, both of Aichi; Yasuyoshi Yamamoto, Gifu, all of Japan

[73] Assignee: Menicon Co., Ltd., Nagoya, Japan

[21] Appl. No.: 957,898

[22] Filed: Oct. 8, 1992

[51] Int. Cl.$^5$ .............................. B23B 31/20
[52] U.S. Cl. ........................ 279/43.7; 279/51; 279/58
[58] Field of Search .............. 279/43, 43.2, 43.7, 279/50, 51, 54, 57, 58, 65, 4.04, 4.12; 409/231, 233

[56] References Cited

U.S. PATENT DOCUMENTS

| | | | |
|---|---|---|---|
| 1,180,355 | 4/1916 | White | 279/4.04 |
| 2,500,383 | 3/1950 | Sadler et al. | 279/4.04 |
| 3,521,894 | 7/1970 | Haviland et al. | 279/4.04 |
| 3,790,182 | 2/1974 | Schuman | 279/43 |
| 4,790,699 | 12/1988 | Ringel | 279/4.04 X |

Primary Examiner—Timothy V. Eley
Attorney, Agent, or Firm—Sughrue, Mion, Zinn, Macpeak & Seas

[57] ABSTRACT

An apparatus for cutting ocular lens materials is disclosed which includes a rotating drive unit, a chuck for holding the lens material, a main shaft for transmitting a rotational force from the rotating drive unit to the chuck, and a coupling for supporting the main shaft and the chuck in a freely rotatable way; the chuck comprising finger members that are normally urged toward the side where they are closed and a cylinder portion for operation in such a way as to open the finger members; the chuck and the main shaft being connected concentrically; a passageway being provided for applying a working pressure from outside to the cylinder portion.

10 Claims, 6 Drawing Sheets

APPARATUS FOR CUTTING OCULAR LENS MATERIALS

BACKGROUND OF THE INVENTION

This invention relates to an apparatus for cutting ocular lens materials, as well as a chuck to be used with that apparatus. More specifically, this invention relates to an apparatus for cutting ocular lens materials (hereinafter referred to simply as "lens materials") in the process of producing ocular lenses such as contact lenses and intraocular lenses. The invention also relates to a chuck for securing lens materials to said cutting apparatus.

Figure 8:
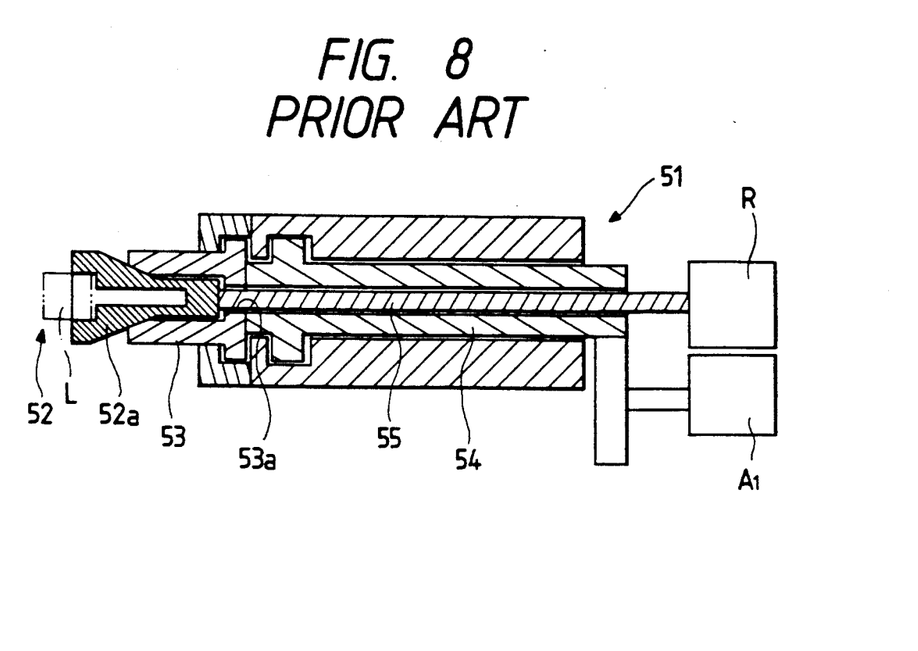
FIGS. 8 and 9 are schematic cross-sectional views showing two examples of the prior art chuck.

Conventional chucks for securing lens materials to cutting apparatus are classified as a "drawbar" type and a "vacuum" type. A chuck of the drawbar type is shown in FIG. 8. The chuck generally indicated by 51 comprises a collet chuck 52 and a tubular holder 53 with a bottom that holds the collet chuck 52 by surrounding it. The holder 53 has a hollow main shaft 54 connected thereto for transmitting a rotational force from a rotating drive unit A1 to the holder 53. The collet chuck 52 has a rod-like drawbar 55 connected to its basal end for transmitting a reciprocal force from a reciprocating drive unit R to the collet chuck 52.

The drawbar 55 is inserted into the hollow portion of the main shaft 54 in such a way as to form a slight clearance; the drawbar 55 is also inserted into a hole 53a in the bottom of the holder 53.

The collet chuck 52 has a plurality of fingers 52a that are formed in such a manner as to hold a lens material in position. The back side of each finger 52a is tapered or the collector chuck 52 has such a shape that its outside diameter decreases gradually from the finger 52a toward the base.

When the collet chuck 52 is pulled together with the drawbar 55 by means of the reciprocating drive unit R, the tapered back side of each finger 52a is pressed against the peripheral edge of the opening in the holder 53, whereupon the resulting counterforce causes the fingers 52a to close to grip the lens material L which is placed in the collet chuck 52.

Conversely, if the collet chuck 52 is pushed out of the holder 53, the fingers 52a will return to the initial open state, causing the lens material L to be disengaged from the collet chuck 52.

Figure 9:
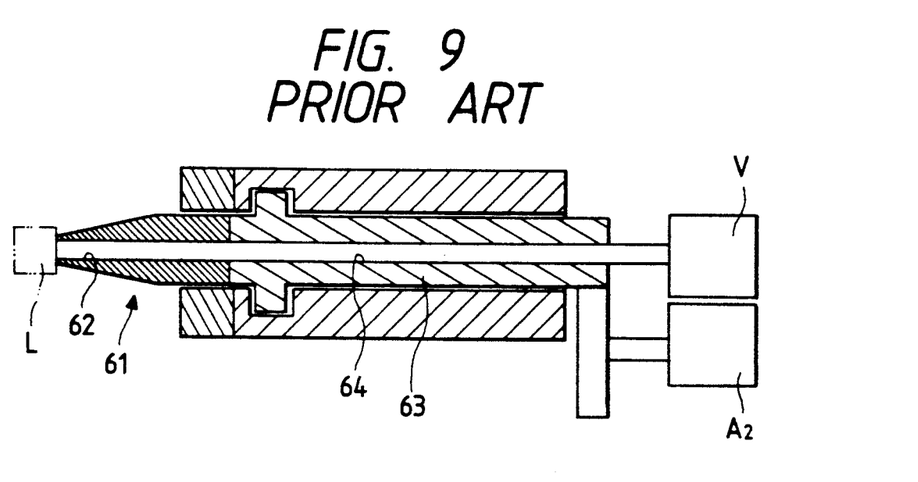

A chuck of the vacuum type is shown in FIG. 9. The chuck generally indicated by 61 is of a tubular form that has a gas passageway 62 bored through it along the central axis. The chuck 61 has one end of a main shaft 63 connected thereto for transmitting a rotational force from a rotating drive unit A2 to the chuck 61. The main shaft 63 has a gas passageway 64 bored through it along the central axis that communicates with the gas passageway 62 through the chuck 61. The main shaft 63 has an air aspirator V provided on the other end that communicates with the gas passageway 64.

If a lens material L is placed at the end of the chuck 61 to close the gas passageway 62 and when the air aspirator V is actuated, a negative pressure is established within the gas passageway 62, whereupon the lens material is fixed on the chuck 61 by being sucked to its end.

In the case of a chuck of the first type, the drawbar 55 will rotate in synchronism with the main shaft 54. Since the drawbar 55 is an elongated member, all or part of it will often rotate eccentrically and, in an extreme case, it may contact the inner surface of the hollow portion of the main shaft 54. As a result, vibrations will occur to lower the precision of the cut surface of the lens material.

In the case of a chuck of the second type, air must be sucked with a sufficient force to hold the lens material even in the midst of cutting it with a blade applied. Hence, a bulky air aspirator is necessary, leading to a higher equipment cost. A further problem with the vacuum type is that if the air aspirator stops operating for some reason such as power failure, the lens material will drop.

SUMMARY OF THE INVENTION

The present invention has been accomplished under these circumstances and has as an object providing a cutting apparatus that is improved in cutting accuracy by eliminating any factor such as the drawbar that will contribute to the occurrence of vibrations.

Another object of the present invention is to provide a chuck for use with an apparatus for cutting lens materials that is capable of exhibiting a constant grip force at any time even if there occurs power failure or a variation in voltage.

The first object of the present invention can be attained by an apparatus for cutting ocular lens materials that comprises:

(a) a rotating drive unit, a chuck for holding the lens material, a main shaft for transmitting a rotational force from the rotating drive unit to the chuck, and a coupling for supporting the main shaft and the chuck in a freely rotatable way;

(b) the chuck comprising finger members that are normally urged toward the side where they are closed and a cylinder portion for operation in such a way as to open the finger members;

(c) the chuck and the main shaft being connected concentrically;

(d) with a passageway being provided for applying a working pressure from outside to the cylinder portion.

The passageway may consist of a first passageway that penetrates the side wall of the cylinder portion radially, a second passageway that penetrates the coupling radially, and an annular groove that is formed circumferentially in the outer peripheral surface of the cylinder portion and/or the inner peripheral surface of the coupling and which communicates with the first and second passageways.

The passageway may also consist of a third passageway that extends from the inside of the cylinder portion along the central axis of the main shaft to reach its interior, a fourth passageway that penetrates the main shaft radially and which communicates with the third passageway, a fifth passageway that penetrates the side wall of said coupling radially, and an annular groove that is formed circumferentially in the outer peripheral surface of the main shaft and/or the inner peripheral surface of the coupling and which communicates with the fourth and fifth passageways.

In still another embodiment, the passageway may extend from the inside of the cylinder portion along the central axis of the main shaft to reach the end on the side here the main shaft is connected to said rotating drive unit.

The second object of the present invention can be attained by a chuck for use with the above-described cutting apparatus, which chuck consists of a holding portion and a cylinder portion, (a) the holding portion comprising a collet chuck that has at its distal end a plurality of fingers for holding an ocular lens material that are elastic and in a slightly open state, a holder that is substantially tubular and which holds the collet chuck as it is inserted from the distal end into the hollow portion, and a spring member that urges said collet chuck in such a way that it is pulled from the distal end of the holder into the hollow portion, the fingers being closed by contact with the inner edge at the distal end of the holder when the collet chuck is pulled into the holder whereas said fingers are reverted to the open state when the collet chuck is pushed out of the holder by means of said cylinder portion;

(b) the cylinder portion comprising a tubular casing that is secured concentrically to the basal end of said holder and a piston that is provided slidably within the casing, the piston being so adapted that when a working pressure is exerted on its back side, the piston moves toward the holding portion and pushes said collet chuck toward the distal end of said holder counteracting the elastic force of said spring member and that when the working pressure is removed, said piston will move away from the collet chuck.

In a preferred embodiment, a stopper may be provided within said collet chuck for limiting the depth by which the lens material is inserted into the space defined by the fingers.

DETAILED DESCRIPTION OF THE INVENTION

When a working pressure is exerted through the passageway in the cutting apparatus of the present invention, the pressure will reach the cylinder portion. The cylinder portion then acts on the closed finger members to open them, making them ready for the mounting of the lens material.

Thus, the lens material is inserted into the space defined by the finger members and, thereafter, the working pressure is removed, whereupon the cylinder portion becomes inactive, causing the finger members to be reverted to the closed state to grip the lens material. With it being thus gripped, the lens material is rotated for cutting operation. In the apparatus of the present invention, the chuck itself is capable of holding the lens material without applying any manipulating force. In other words, the apparatus of the present invention does not contain any elongated member such as the drawbar in the conventional apparatus that will cause vibrations and, hence, it will experience very limited abrasions during rotation of the lens material.

As a result, the precision of the cut surface of the lens material is improved markedly.

We now describe how the chuck of the present invention is operated. When a working pressure is exerted within the cylinder of the chuck, the piston will move toward the collet chuck and pushes it out of the distal end of the holder counteracting the elastic force of the incorporated spring member. Then, the fingers of the collet chuck are disengaged from the constraint by the distal end of the holder and they will open to the initial state, becoming ready for the mounting of the lens material.

If the working pressure is removed, the elastic force of the spring member will permit the collet chuck to be pulled into the holder as it pushes back the piston to the initial state. Then, the fingers of the collet chuck will be constrained by the distal end of the holder and are closed to grip the lens material. With it being thus gripped, the lens material is rotated for cutting operation. In the apparatus of the present invention, the elastic force due to a predetermined deflection of the spring member is transformed to the grip force of the collect chuck and, hence, the lens material can at all times be gripped with a constant force.

Under the circumstances, there is no possibility that the lens material will be dropped even if power failure occurs, nor will it be offset during the cutting operation which, therefore, can be performed with high precision.

The cutting apparatus and the chuck of the present invention are described below with reference to accompanying drawings.

Figure 2:
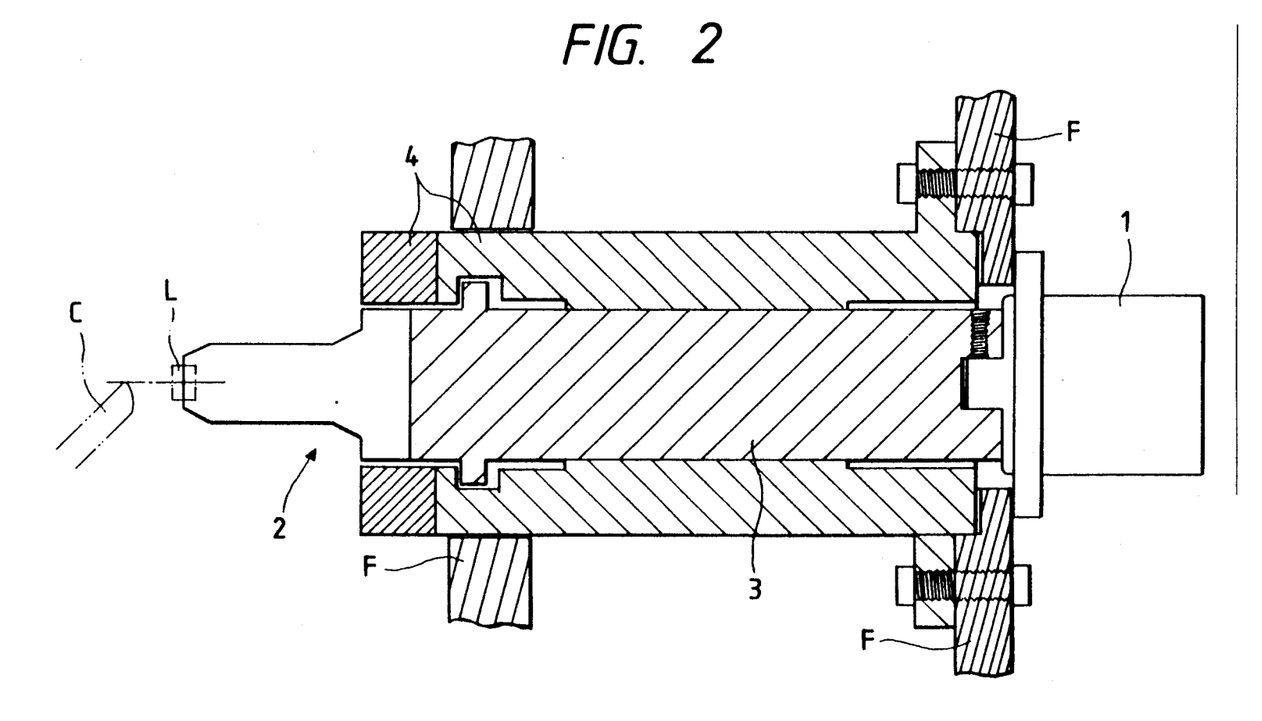
FIG. 2 is a schematic cross-sectional view showing an example of the cutting apparatus of the present invention.

FIG. 2 shows schematically an example of the cutting apparatus of the present invention.

Referring to FIG. 2, shown by 1 is a rotating drive unit for rotating a lens material L during cutting operation; 2 is a chuck for gripping the lens material; 3 is a main shaft by means of which a rotational force is transmitted from the rotating drive unit 1 connected at one end to the chuck 2 connected at the other end of the shaft; and 4 is a splittable coupling for rotatably supporting the main shaft 3 in the longitudinal direction. A commercial air spindle set may be used as the combination of main shaft 3 and coupling 4. The coupling 4 is securely supported on a frame F or the like.

The rotating drive unit 1 in the apparatus shown in FIG. 2 is a motor whose body is secured to the frame F whereas its output shaft is connected to the main shaft 3. If desired, a motor of a different type in which the shaft is fixed whereas the body is rotated may be used in such a way that its body is connected to the main shaft 3.

Shown by L in FIG. 2 is the lens material mounted on the chuck 2, and C is a tool for cutting the lens material L.

Figure 1:
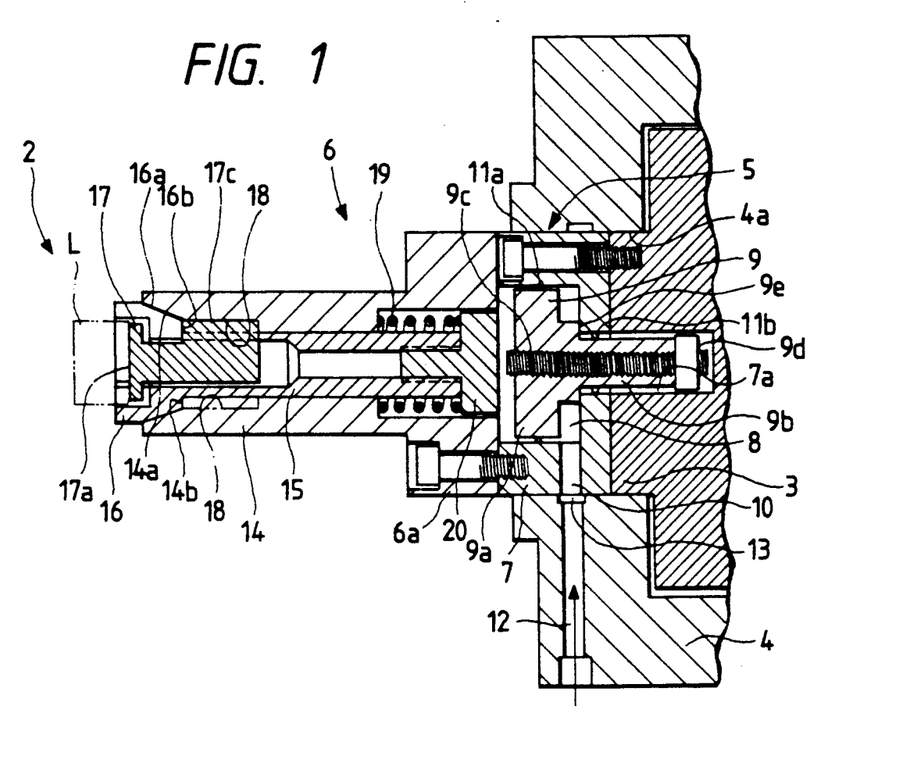
FIG. 1 is a cross-sectional view showing an example of the chuck of the present invention.

FIG. 1 shows details of the chuck 2. The chuck 2 comprises a cylinder portion 5 that is fitted into a hole 4a bored at the end of the coupling 4 and which is connected with a screw to one end of the main shaft 3, and a holding portion 6 that is connected at the basal end 6a with a screw to the cylinder portion 5 for fixing the lens material L in position.

The cylinder portion 5 is composed of a cylindrical casing 7 with a bottom and a piston 9 fitted into the inner space 8 of casing 7 (said space is hereunder referred to as the "piston compartment") in such a way that it is freely slidable in the axial direction. The casing 7 has a passageway 10 formed in the side wall for establishing communication between the piston compartment 8 and the space exterior to the casing 7.

The piston 9 is composed of a disk-shaped sliding portion 9a which slides within the piston compartment 8 and a cylindrical guide portion 9b that is formed as a projection from the center of the end face of the sliding portion 9a which faces the main shaft 3. The guide portion 9b penetrates through a hole 7a bored in the center of the bottom of the casing 7. O-rings 11a and 11b are fitted around the circumferences of the sliding portion 9a and the guide portion 9b, respectively, thereby sealing both the gap between the sliding portion 9a and the lateral side of the piston compartment 8 and the gap between the guide portion 9b and the inner surface of the hole 7a.

A thread hole is formed through the piston 9 along the central axis and an adjusting rod 9c that is longer than the overall length of the piston 9 and which has a male thread formed on the circumference is threaded into said hole. A nut 9d is threaded onto that part of the adjusting rod 9c which projects beyond the distal end of the guide portion 9b of the piston 9. Hence, the adjusting rod 9c can be advanced or retracted through the thread hole in the piston 9 so that it is fixed by the nut 9d in a desired position. A step 9e with an increased outside diameter is formed near the base of the guide portion 9b. Since the step 9e contacts the bottom of the piston compartment 8, a space is formed at all times between the sliding portion 9a of the piston and the bottom of the casing 7 to prevent the blocking of the gas passageway 10.

The coupling 4 has a gas passageway 12 formed in the side wall in such a way that it extends from the hole 4a through the side wall to reach the space exterior to the coupling. The passageway 10 in the casing 7 and the passageway 12 in the coupling 4 are provided in positions that agree with each other in the axial direction. An annular groove 13 is formed circumferentially in the inner peripheral surface of the coupling 4 at a position that registers with the gas passageway 12. This offers the following advantage: even if the positions of the two passageways 10 and 12 are offset in the circumferential direction, compressed air (which may be replaced by a compressed gas such as nitrogen gas) that is supplied through the passageway 12 in the coupling 4 to exert a working pressure passes through the groove 13 so that it is directed toward the passageway 10 in the cylinder 5 to reach the piston compartment 8.

Figure 3:
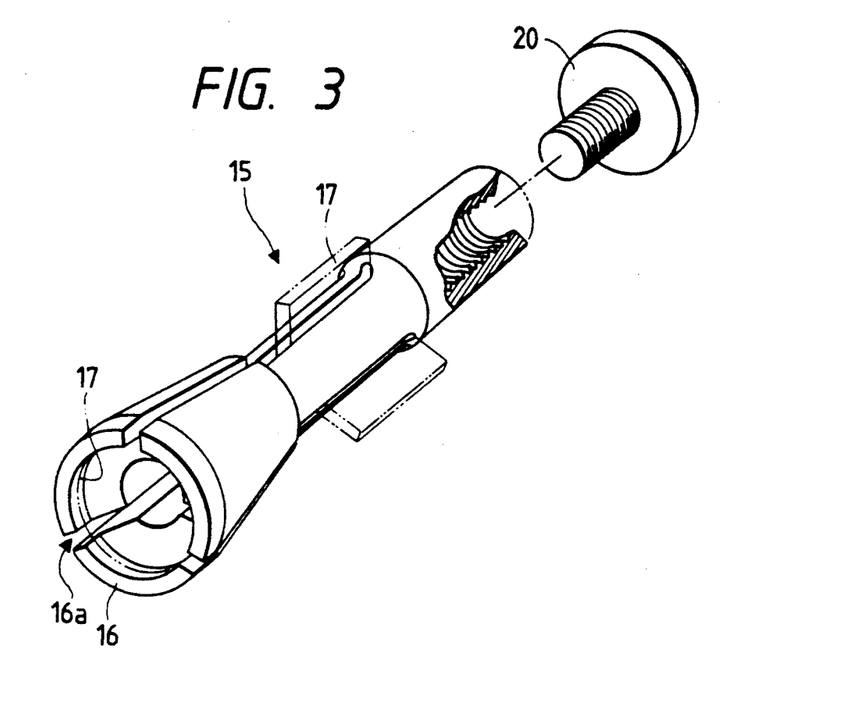
FIG. 3 is a cutaway showing an example of the collet chuck as part of the chuck of the present invention.

We now describe the holding portion 6. The holding portion 6 is composed of a cylindrical holder 14 having a step formed on the circumference and a collet chuck 15 for holding the lens material. That part of the holder 14 which has an increased outside diameter, namely, the basal end 6a, is bolted to the cylinder portion 5. The collet chuck 15 is inserted into the hollow part of the holder 14 by being pushed in from its distal end. As shown in FIG. 3, the collet chuck 15 is substantially cylindrical in shape and has three elastic fingers 16 at the distal end for gripping the lens material L. The back sides 16a of the fingers 16 are tapered, i.e., they form a conical surface having outside diameter which decreases from the distal end to the base.

The inner peripheral surface of the end of the holder 14 provides a tapered face 14a that forms a slightly smaller angle than what the tapered faces of the fingers 16 form with the central axis. When the collet chuck 15 is pulled into the holder 14, the back sides 16a of the three fingers 16 will contact the tapered face 14 of the holder 14 and they will close slightly towards the central axis as they are guided by that tapered face 14a. The thus closing fingers 16 are capable of gripping the lens material L. Conversely, if the collet chuck 15 is pushed out of the holder 14, the fingers 16 are released from the constraint by the end portion of the holder 14, whereupon they are reverted to the initial state and will open slightly.

Figure 4:
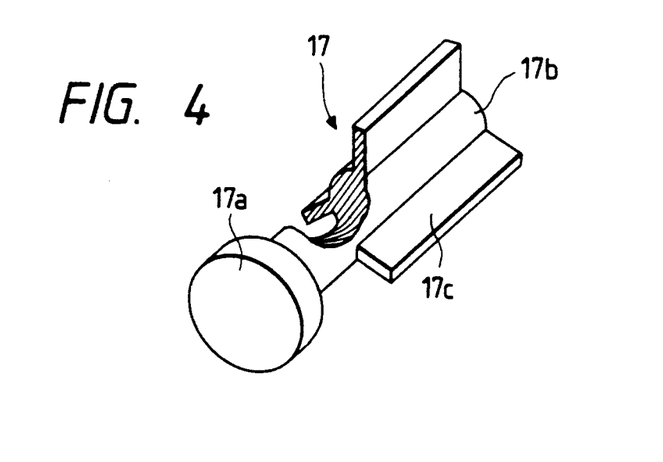
FIG. 4 is a cutaway showing in detail the stopper as part of the chuck shown in FIG. 1.

A stopper 17 for limiting the depth of insertion of the lens material L is inserted into the hollow portion of the collet chuck 15 by being pushed in from the distal end. As shown in FIG. 4, the stopper 17 is composed of a disk-shaped contact portion 17a for contacting the lens material L and a body 17b that has a columnar shape that conforms to the hollow portion of the collet chuck 15. The body 17b has three flaps 17c formed in such a way that they can be inserted between adjacent fingers 16 on the collet chuck 15. The inner surface of the hollow portion of the holder 14 has three slits 18 formed in positions that correspond to the flaps 17c (see FIG. 1). The stopper 17 is secured to the holder 14 as the flaps 17c are tightly fitted into the slits 18. The arrangement described above insures that whenever the collet chuck 15 is fitted into the holder 14 together with the lens material L, the surface of contact between the stopper 17 and the lens material L will register at the same position within the chuck 2; hence, ocular lenses of a desired specification can be manufactured in a consistent manner.

The holder 14 has a step formed in the hollow portion in an area that is more or less offset from the center forward the basal end 6a and the zone from the step to the basal end 6a has a larger inside diameter than the other areas. Accommodated in that zone is a precompressed coil spring 19 that is loosely fitted around the collet chuck 15 inserted into the holder 14. The collet chuck 15 has at its end a disk-shaped spring bearing 20 that is substantially equal in outside diameter to the coil spring 19. The surface of the spring bearing 20 that faces the cylinder is so adapted that it is contacted by the end of the adjusting rod 9c in the piston 9.

The chuck 2 having the construction described above is used in the following manner.

The chuck 2 according to the embodiment under consideration is so designed that the elastic force of the coil spring 19 insures that the collet chuck 15 is pulled at all times into the holder 14. When compressed air is injected through the gas passageway 12 in the coupling 4, the piston 9 will move until it contacts the end face of the holding portion 6. Then, the adjusting rod 9c protruding slightly from the end face of the piston 9 will push the spring bearing 20 and pushes the collet chuck 15 out of the holder 14 counteracting the elastic force of the coil spring 19.

The compressed air will leak out by coming through the small gap between the cylinder portion 5 and the coupling 4, but this is not a problem since the air is supplied in a greater amount than it leaks.

The collet chuck 15 is moved by an amount that corresponds to the projection of the adjusting rod 9c beyond the piston 9. As a result, the fingers 16 at the distal end of the collet chuck 15 will slightly open as they are released from the constraint by the distal end of the holder 14. The amount of movement of the piston 9, or the amount by which the fingers 16 are opened or closed, can be controlled by loosening the nut 9d and either advancing or retracting the adjusting rod 9d.

In the next step, the lens material L is inserted into the space defined by the fingers 16 until it contacts the stopper 17. Thereafter, the injection of compressed air is stopped, whereupon the working pressure is removed and, under the elastic force of the coil spring 19, the collet chuck 15 is pulled into the holder 14 as it pushes back the adjusting rod 9c and, hence, the piston 9. Then, the fingers 16 are closed to grip the lens material L. Subsequently, the chuck 2 is rotated by the rotating drive unit 1 to perform a cutting operation on the lens material L.

As will be understood from the foregoing discussion, the force to grip the lens material is kept constant since it is imparted from the coil spring 19 which is accommodated compactly within the holding portion 6 and which is deflected under a predetermined force. In addition, there is no need to rotate the chuck with it being connected to an apparatus for generating reciprocating motions or an air aspirator as in the prior art and during rotation the collet chuck 15 is disconnected from the piston which is a mechanism for releasing the grip force. Needless to say, it is unnecessary to use an elongated member such as a drawbar that is a major source of vibrations. Hence, the lens material can be rotated experiencing a very small amount of variations.

As a result, the precision of the cut surface of the lens material is improved so markedly that there is little or no need to polish the cut surface of the lens as is commonly the case in the prior art. As a further advantage, the present invention enables the lens material to be cut to a specular surface.

Figure 1A:
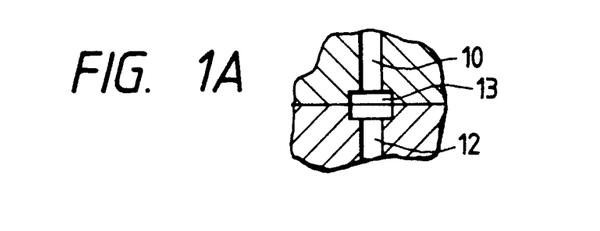
FIG. 1A is a partial cross-sectional view showing a different arrangement of an annular groove.

In the example under discussion, the annular groove 13 which communicates with the gas passageways 10 and 12 is formed in the inner surface of the coupling 4. It should, however, be noted that the present invention is by no means limited to the case where the annular groove 13 is formed on the coupling side and that it may be formed on the circumference of the cylinder portion 5. If desired, two annular grooves may be formed, one on the circumference of the cylinder portion and the other in the inner surface of the coupling, in such a way that they are in registry with each other as shown in FIG. 1A.

Another example of the cutting apparatus of the present invention is described below with reference to FIG. 5. In this case, the cutting apparatus is so adapted that compressed air for manipulating the piston will be supplied from substantially the central part of the coupling.

As shown, the coupling indicated by 31 has a single gas passageway 32 formed in such a way that it extends from the circumference of the central part of the coupling 31 towards its central axis. The coupling 31 also has an annular groove 33 that is formed in the inner surface circumferentially in a position that registers with the gas passageway 32. The main shaft indicated by 34 has another gas passageway 35a that penetrates the shaft diametrically in a position that registers with the passageway 32 directed toward the axis of that shaft 34. Yet another single gas passageway 35b is formed in the main shaft 34 along the central axis in such a way that it extends from the passageway 35a to the cylinder portion 36.

This layout of two gas passageways 35a and 35b in the main shaft 34 is adopted in order to insure that the mass distribution of the main shaft 34 which is a rotating body is symmetrical with respect to the central axis.

Figure 5:
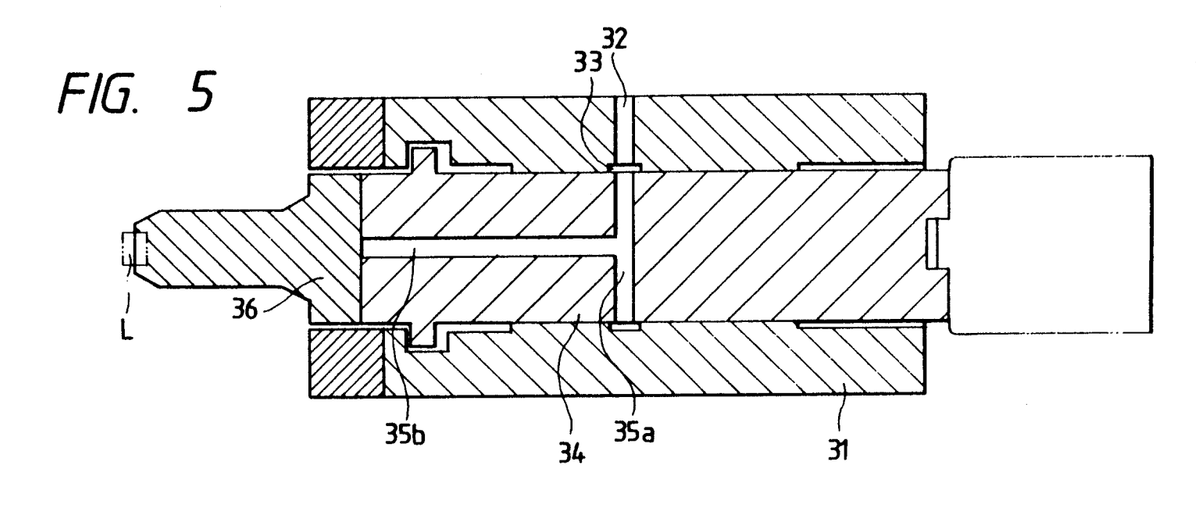
FIG. 5 is a cross-sectional view showing another example of the cutting apparatus of the present invention.
Figure 6:
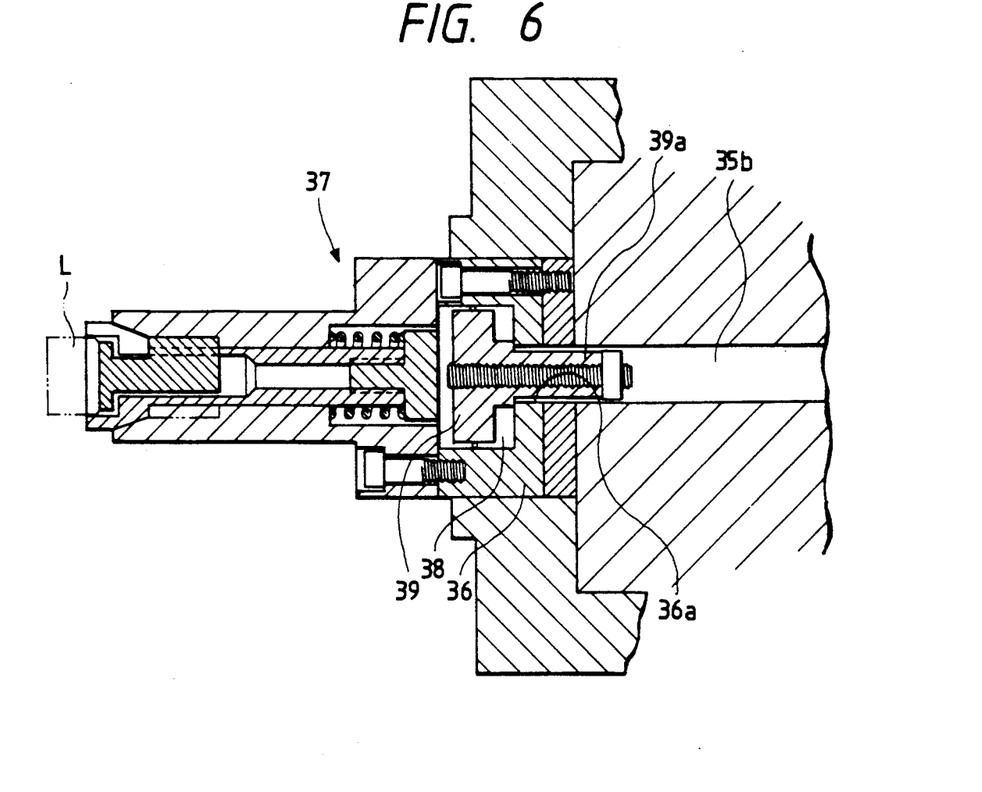
FIG. 6 is a schematic cross-sectional view showing another example of the chuck of the present invention.

FIG. 6 shows another example of the chuck of the present invention, which is indicated by 37 and intended to be mounted on the cutting apparatus shown in FIG. 5.

As shown, the chuck 37 has a through-hole 36a that is formed in the center of the bottom of a cylinder portion 36 for establishing communication between a piston compartment 38 and a gas passageway 35b. The piston 39 has a guide portion 39a that is inserted into the passageway 35b via the through-hole 36a.

Obviously, the chuck 37 shown in FIG. 6 is identical in structure to the chuck 2 shown in FIG. 1 except for the following two points: it has the through-hole 36a in place of the gas passageway 10; and O-ring 11b is not provided.

In the example shown in FIG. 5, the gas passageway 32 is provided substantially in the center of the coupling 31. However, this is not the sole case of the present invention and the passageway 32 may be provided closer to the chuck or the rotating drive unit.

Figure 5A:
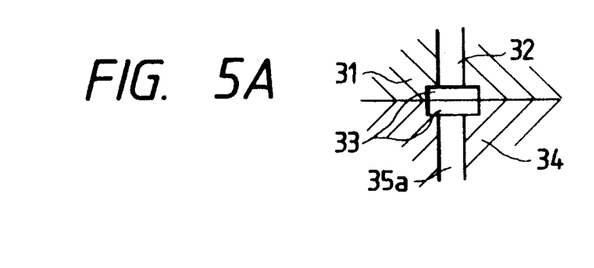
FIG. 5A is a partial cross-sectional view showing a different arrangement of an annular groove.

The cutting apparatus of the present invention also is not limited to the case where the annular groove 33 is formed in the inner peripheral surface of the coupling 31 and it may be formed on the circumference of the main shaft 34. If desired, as shown in FIG. 5A, two annular grooves 33 may be formed, one on the circumference of the main shaft and the other in the inner peripheral surface of the coupling, in such a way that they are in registry with each other.

Figure 7:
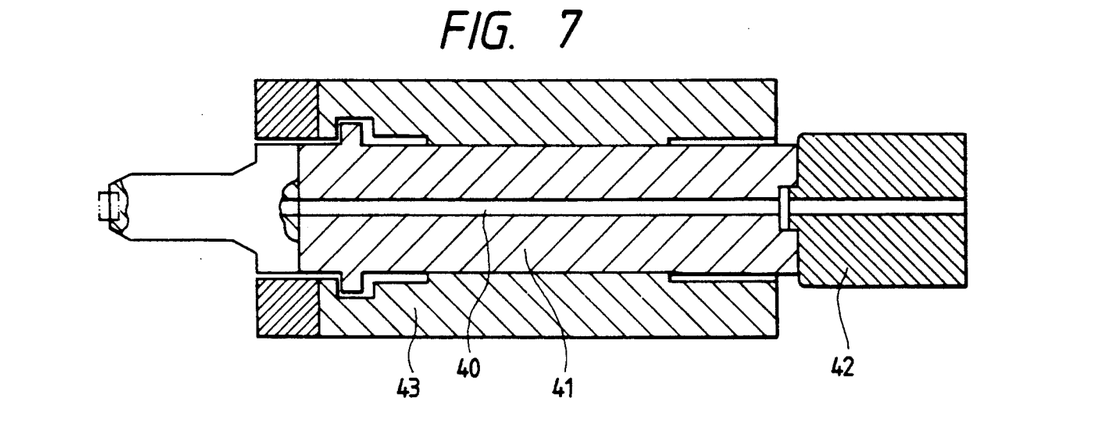
FIG. 7 is a cross-sectional view showing still another example of the cutting apparatus of the present invention.

FIG. 7 shows still another example of the cutting apparatus of the present invention. As shown, a main shaft 41 has a gas passageway 40 formed in such a way that it extends from one end facing the chuck to the other end facing a rotating drive unit 42 along the central axis of the main shaft 41. The apparatus is so adapted that compressed air can be injected even from behind the rotating drive unit 42. The apparatus has the advantage that there is no need to provide a diametric gas passageway in the main shaft 41, nor is it necessary to bore a hole in the coupling 43.

The apparatus under discussion can be equipped with the chuck 37 shown in FIG. 6.

The figures on the collet chuck as part of the chuck of the present invention are typically made of metallic materials such as carbon steel and stainless steel. However, non-metallic materials can be used as long as they have sufficient strength, toughness and endurance to grip the lens material; examples of applicable non-metallic materials are engineering plastics as typified by polycarbonates.

The cutting apparatus of the present invention eliminates the generation of vibrations that would otherwise occur during rotation of the workpiece and, hence, it enables the lens material to be cut with a very high precision. The chuck of the present invention has the advantage that it is capable of holding the lens material with a constant force at all times and its grip force will not be affected by power failure or voltage variations.

What is claimed is:

1. An apparatus for cutting an ocular lens material comprising:
    (a) a rotating drive unit (b) a chuck for holding the ocular lens material, said chuck including finger members and being movable along a longitudinal axis of said drive unit, biasing means for normally urging said chuck, and attendantly said finger members, in a first direction along said longitudinal axis so as to urge said finger members to a closed position and an opening means for opening said finger members by moving said chuck, and attendantly said finger members, in a second direction opposite said first direction, said opening means including a passageway means for applying a working pressure to said apparatus so as to move said chuck in said second direction;

(c) a main shaft concentrically connected to said chuck for transmitting a rotational force from the rotating drive unit to said chuck; and (d) a coupling for rotatably supporting said main shaft and said chuck together.

2. An apparatus for cutting an ocular lens material comprising:

(a) a rotating drive unit;

(b) a chuck for holding the ocular lens material, said chuck comprising finger members, biasing means for normally urging said finger members to a position where they are closed and an opening means for opening said finger member, said opening means including a cylinder portion and a passageway means for applying a working pressure;

(c) a main shaft concentrically connected to said chuck for transmitting a rotational force from the rotating drive unit to said chuck; and (d) a coupling for rotatably supporting said main shaft and said chuck together, wherein said passageway means comprising a first passageway that penetrates an outer wall of said cylinder portion radially, a second passageway that penetrates said coupling radially, and an annular groove that is formed circumferentially in an inner peripheral surface of the coupling and which communicates with said first and second passageways.

3. An apparatus for cutting an ocular lens material comprising:

(a) a rotating drive unit;

(b) a chuck for holding the ocular lens material, said chuck comprising finger members, biasing means for normally urging said finger members to a position where they are closed and an opening means for opening said finger member, said opening means including a cylinder portion and a passageway means for applying a working pressure;

(c) a main shaft concentrically connected to said chuck for transmitting a rotational force from the rotating drive unit to said chuck; and (d) a coupling for rotatably supporting said main shaft and said chuck together, wherein said passageway means comprising a first passageway that penetrates an outer wall of said cylinder portion radially, a second passageway that penetrates said coupling radially, and an annular groove that is formed circumferentially in an outer peripheral surface of the cylinder portion and which communicates with said first and second passageways.

4. An apparatus for cutting an ocular lens material comprising:

(a) a rotating drive unit;

(b) a chuck for holding the ocular lens material, said chuck comprising finger members, biasing means for normally urging said finger members to a position where they are closed and an opening means for opening said finger member, said opening means including a cylinder portion and a passageway means for applying a working pressure;

(c) a main shaft concentrically connected to said chuck for transmitting a rotational force from the rotating drive unit to said chuck; and (d) a coupling for rotatably supporting said main shaft and said chuck together, wherein said passageway means comprising a first passageway that extends from an inside of the cylinder portion along the central axis of said main shaft to reach its interior, a second passageway that penetrates the main shaft radially and which communicates with said first passageway, a third passageway that radially penetrates said coupling, and an annular groove that is formed circumferentially in the inner peripheral surface of the coupling and which communicates with said second and third passageways.

5. An apparatus for cutting an ocular lens material comprising:

(a) a rotating drive unit;

(b) a chuck for holding the ocular lens material, said chuck comprising finger members, biasing means for normally urging said finger members to a position where they are closed and an opening means for opening said finger member, said opening means including a cylinder portion and a passageway means for applying a working pressure;

(c) a main shaft concentrically connected to said chuck for transmitting a rotational force from the rotating drive unit to said chuck; and (d) a coupling for rotatably supporting said main shaft and said chuck together, wherein said passageway means comprising a first passageway that extends from an inside of the cylinder portion along the central axis of said main shaft to reach its interior, a second passageway that penetrates the main shaft radially and which communicates with said first passageway, a third passageway that radially penetrates said coupling, and an annular groove that is formed circumferentially in an outer peripheral surface of the main shaft and which communicates with said second and third passageways.

6. An apparatus for cutting an ocular lens material comprising:

(a) a rotating drive unit;

(b) a chuck for holding the ocular lens material, said chuck comprising finger members, biasing means for normally urging said finger members to a position where they are closed and an opening means for opening said finger member, said opening means including a cylinder portion and a passageway means for applying a working pressure;

(c) a main shaft concentrically connected to said chuck for transmitting a rotational force from the rotating drive unit to said chuck; and (d) a coupling for rotatably supporting said main shaft and said chuck together, wherein said passageway means extends from an inside of the cylinder portion along the central axis of said main shaft to reach an end on a side where the main shaft is connected to said rotating drive unit.

7. An apparatus for cutting an ocular lens material comprising:

(a) a rotating drive unit;

(b) a chuck for holding the ocular lens material, said chuck comprising finger members, biasing means for normally urging said finger members to a position where they are closed and an opening means for opening said finger member, said opening means including a cylinder portion and a passageway means for applying a working pressure, supplied externally of said apparatus;

(c) a main shaft concentrically connected to said chuck for transmitting a rotational force from the rotating drive unit to said chuck; and (d) a coupling for rotatably supporting said main shaft and said chuck together, wherein said chuck includes:

(a) a holding portion comprising a collet chuck that has at its distal end the fingers for holding the ocular lens material that are elastic and in a slightly open state, and a holder that is substantially tubular and which holds said collet chuck as it is inserted from the distal end into the hollow portion, said biasing means includes a spring member that urges said collet chuck in such a way that it is pulled from the distal end of said holder into the hollow portion, the fingers being closed by contact with an inner edge at the distal end of the holder when said collet chuck is pulled into the holder whereas said finger are reverted to the open state when the collet chuck is pushed out of the holder by said cylinder portion;

(b) the cylinder portion comprising a tubular casing that is secured concentrically to a proximal end of said holder and a piston that is provided slidably within said casing, said piston being so adapted that when the working pressure is exerted on its back side, the piston moves toward the holding portion and pushes said collet chuck toward the distal end of said holder counteracting the elastic force of said spring member and that when said working pressure is removed, said piston will move away from the collet chuck.

8. The apparatus according to claim 7, wherein a stopper is provided within said collet chuck for limiting the depth by which the ocular lens material is inserted into the space defined by the fingers.

9. A chuck device for use with an apparatus for holding an ocular lens material being cut, comprising:

(a) a holding portion including a collet chuck that has at its distal end a plurality of fingers for holding the ocular lens material that are elastic and in a slightly open state, a holder that is substantially tubular and which holds said collet chuck as it is inserted from the distal end into the hollow portion, and a spring member that urges said collet chuck in such a way that it is pulled from the distal end of said holder into the hollow portion, the fingers being closed by contact with an inner edge at the distal end of the holder when said collet chuck is pulled into the holder whereas said finger are reverted to the open state when the collet chuck is pushed out of the holder by said cylinder portion; and (b) a cylinder portion including a tubular casing that is secured concentrically to a proximal end of said holder and a piston that is provided slidably within said casing, said piston being so adapted that when a working pressure is exerted on its back side, said piston moves toward the holding portion and pushes said collet chuck toward the distal end of said holder counteracting the elastic force of said spring member and that when said working pressure is removed, said piston will move away from the collet chuck.

10. The chuck according to claim 9 wherein a stopper is provided within said collet chuck for limiting the depth by which the ocular lens material is inserted into the space defined by the fingers.

* * * * *